United States Patent
Ogiso et al.

(10) Patent No.: US 11,837,199 B2
(45) Date of Patent: Dec. 5, 2023

(54) IMAGE TRANSMISSION APPARATUS, IMAGE TRANSMISSION METHOD, AND PROGRAM

(71) Applicant: SONY INTERACTIVE ENTERTAINMENT INC., Tokyo (JP)

(72) Inventors: Toru Ogiso, Tokyo (JP); Masato Mitsutake, Tokyo (JP); Sachiyo Aoki, Tokyo (JP); Michiko Matsumura, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 17/628,993

(22) PCT Filed: Jul. 21, 2020

(86) PCT No.: PCT/JP2020/028300
§ 371 (c)(1),
(2) Date: Jan. 21, 2022

(87) PCT Pub. No.: WO2021/020240
PCT Pub. Date: Feb. 4, 2021

(65) Prior Publication Data
US 2022/0270572 A1    Aug. 25, 2022

(30) Foreign Application Priority Data
Aug. 1, 2019    (JP) .................................. 2019-142375

(51) Int. Cl.
G09G 5/397    (2006.01)
G09G 3/20    (2006.01)

(52) U.S. Cl.
CPC ........... *G09G 5/397* (2013.01); *G09G 3/2096* (2013.01); *G09G 2340/0464* (2013.01);
(Continued)

(58) Field of Classification Search
CPC ................. G09G 5/397; G09G 3/2096; G09G 2340/0464; G09G 2340/12; G09G 2340/14; G09G 2360/18; G09G 2370/02
See application file for complete search history.

(56) References Cited

U.S. PATENT DOCUMENTS 9,098,192 B2 * 8/2015 Davidson ............ G06F 3/04883
2003/0103247 A1 * 6/2003 Masera .............. H04N 1/00127
358/453
(Continued)

FOREIGN PATENT DOCUMENTS

JP    2006107009 A    4/2006
JP    2008051924 A    3/2008
(Continued)

OTHER PUBLICATIONS

International Search Report and Written Opinion dated Aug. 18, 2020, from PCT/JP2020/028300, 11 sheets.

*Primary Examiner* — Antonio A Caschera
(74) *Attorney, Agent, or Firm* — XSENSUS LLP

(57) ABSTRACT

An image transmission apparatus, an image transmission method, and a program enable a transmission destination to display an image similar to the image displayed at a transmission source. A display target image generation section generates a display target image having a display non-target region reflecting settings of a safe area of a display section. A display control section causes the display section to display an actual display image constituting a portion of the display target image. A transmission image generation section generates a transmission image that represents a portion of the display target image and excludes at least a portion of the display non-target region. A transmission section transmits the transmission image.

15 Claims, 12 Drawing Sheets

(52) U.S. Cl.
CPC ..... *G09G 2340/12* (2013.01); *G09G 2340/14* (2013.01); *G09G 2360/18* (2013.01); *G09G 2370/02* (2013.01)

(56) References Cited

U.S. PATENT DOCUMENTS

| | | | | |
|---|---|---|---|---|
| 2011/0221765 | A1* | 9/2011 | Nason | G06F 21/84 |
| | | | | 345/626 |
| 2013/0201197 | A1* | 8/2013 | Sandmel | H04N 21/426 |
| | | | | 345/545 |
| 2019/0009178 | A1* | 1/2019 | Nakagawa | A63F 13/35 |
| 2019/0371263 | A1* | 12/2019 | Fox | G09G 5/395 |
| 2022/0254321 | A1* | 8/2022 | Ogiso | G09G 5/395 |

FOREIGN PATENT DOCUMENTS

| | | |
|---|---|---|
| JP | 2009044400 A | 2/2009 |
| JP | 2012080373 A | 4/2012 |
| JP | 2015026034 A | 2/2015 |
| JP | 2015515658 A | 5/2015 |
| JP | 2017188833 A | 10/2017 |
| WO | 2010/073363 A1 | 7/2010 |
| WO | 2014/188483 A1 | 11/2014 |

* cited by examiner

IMAGE TRANSMISSION APPARATUS, IMAGE TRANSMISSION METHOD, AND PROGRAM

TECHNICAL FIELD

The present invention relates to an image transmission apparatus, an image transmission method, and a program.

BACKGROUND ART

The display section of a common TV set, for example, may let its screen display an actual display image that is a frame image with its edges cut off by overscan to represent only a portion of the frame image.

SUMMARY

Technical Problem

In a situation such as a live game broadcast or a multi-player game where images are transmitted from source to destination and where a transmission source transmits an entire frame image to a transmission destination that attempts to get the whole frame image displayed in a browser, for example, the destination may display an image different from the actual display image.

The present invention has been made in view of the above circumstances and provides as an object an image transmission apparatus, an image transmission method, and a program for enabling a transmission designation to display an image similar to the image displayed at a transmission source.

Solution to Problem

In solving the above problem and according to the present invention, there is provided an image transmission apparatus including a display target image generation section configured to generate a display target image having a display non-target region reflecting settings of a safe area of a display section, a display control section configured to cause the display section to display an actual display image constituting a portion of the display target image, a transmission image generation section configured to generate a transmission image that represents a portion of the display target image and excludes at least a portion of the display non-target region, and a transmission section configured to transmit the transmission image.

In one embodiment of the present invention, the display target image generation section generates the display target image partially including an image rendered in a frame buffer, the rendered image being sized to reflect the settings.

In this embodiment, the display target image generation section may generate the display target image formed of two images overlaid with each other, one of the images being rendered in a first frame buffer, the other image being rendered in a second frame buffer, the images being sized to reflect the settings.

Preferably, in response to a received instruction, the display target image generation section may control whether or not to generate the display target image partially including the rendered image sized to reflect the settings.

Preferably, in response to a received instruction, the display target image generation section may control whether or not to generate the display target image partially including the rendered image sized to reflect the settings. The display target image generation section may generate the display target image formed of a first image and a second image overlaid with each other, the first image being based on an image rendered in a first frame buffer by a first application program, the second image being based on an image rendered in a second frame buffer by a second application program. The display target image generation section may arrange the first image of predetermined size in a predetermined position inside the display target image regardless of whether or not the display target image partially including the image sized to reflect the settings is generated. Depending on whether or not to generate the display target image partially including the image sized to reflect the settings, the display target image generation section may change a region in which pixels of the first image are reflected inside the display target image.

Also according to the present invention, there is provided an image transmission method including the steps of generating a display target image having a display non-target region reflecting settings of a safe area of a display section, causing the display section to display an actual display image constituting a portion of the display target image, generating a transmission image that represents a portion of the display target image and excludes at least a portion of the display non-target region, and transmitting the transmission image.

Also according to the present invention, there is provided a program for causing a computer to execute a procedure including generating a display target image having a display non-target region reflecting settings of a safe area of a display section, causing the display section to display an actual display image constituting a portion of the display target image, generating a transmission image that represents a portion of the display target image and excludes at least a portion of the display non-target region, and transmitting the transmission image.

DESCRIPTION OF EMBODIMENT

One embodiment of the present invention is described below with reference to the accompanying drawings.

Figure 1:
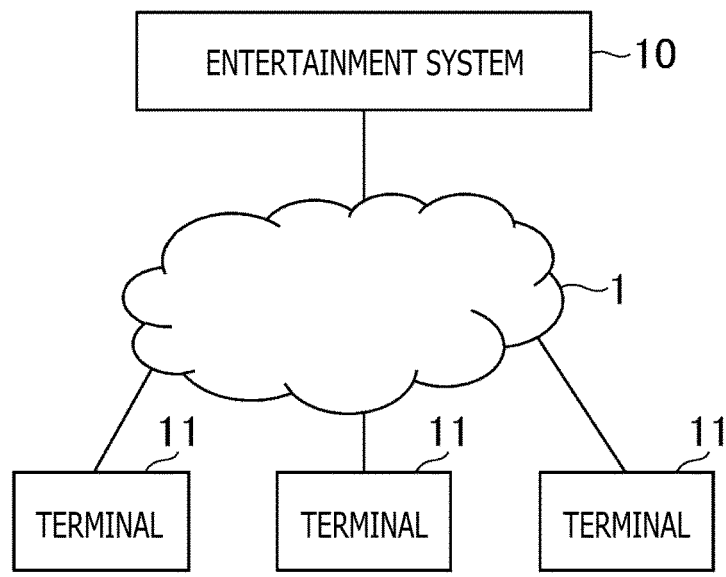
FIG. 1 is a diagram depicting a configuration example of a computer network related to one embodiment of the present invention.
Figure 2:
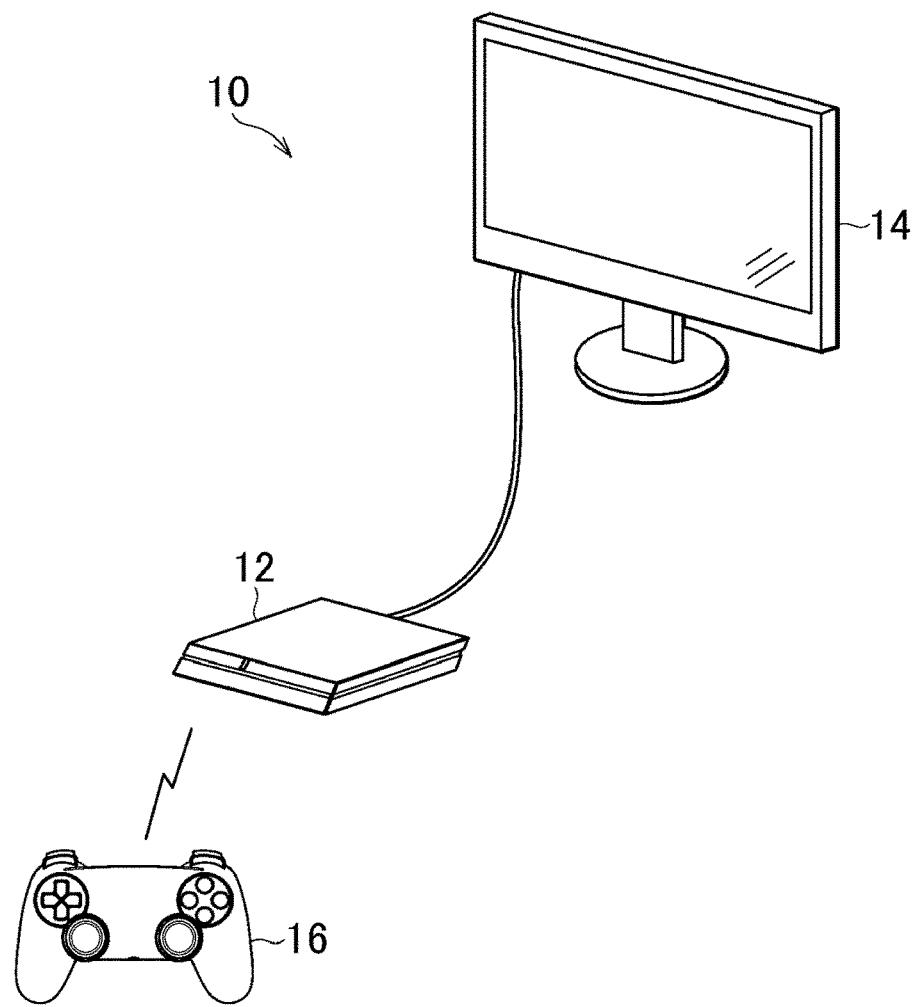
FIG. 2 is a diagram depicting a configuration example of an entertainment system related to one embodiment of the present invention.
Figure 3:
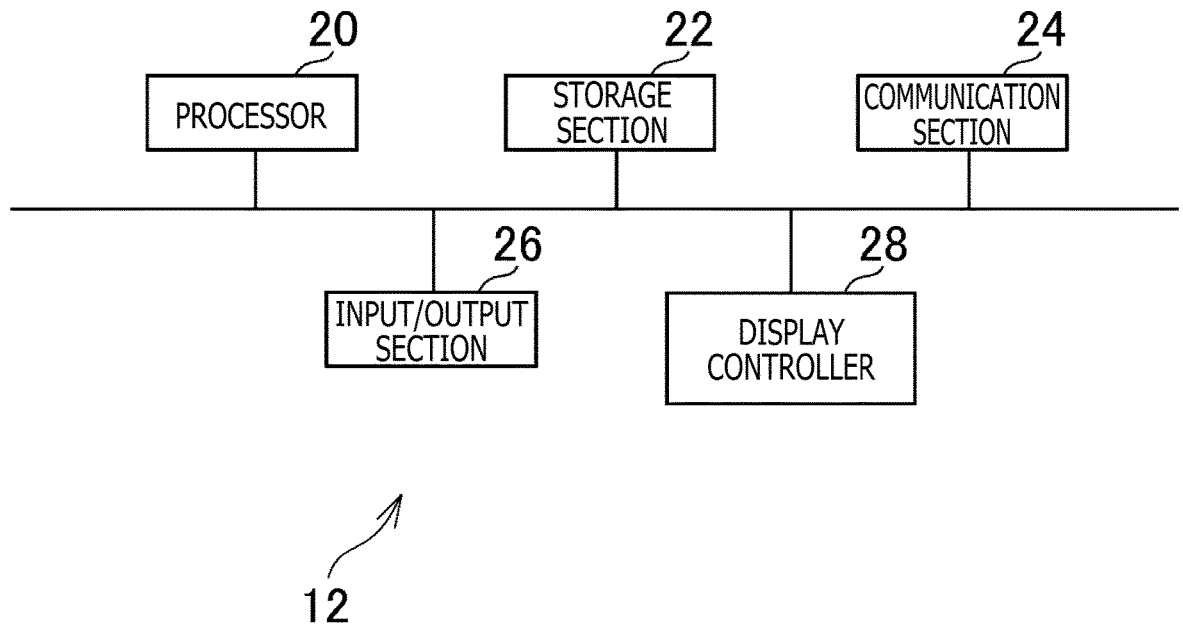
FIG. 3 is a diagram depicting a configuration example of an entertainment apparatus related to one embodiment of the present invention.

FIG. 1 is a diagram depicting an example of a computer network 1 related to one embodiment of the present invention. FIG. 2 is a diagram depicting a configuration example of an entertainment system 10 related to one embodiment of the present invention. FIG. 3 is a diagram depicting a configuration example of an entertainment apparatus 12 related to one embodiment of the present invention.

In this embodiment, as depicted in FIG. 1, the entertainment system 10 and terminals 11 are connected to the computer network 1 such as the Internet. This allows the entertainment system 10 and the terminals 11 to communicate with each other via the computer network 1.

As depicted in FIG. 2, the entertainment system 10 related to this embodiment includes the entertainment apparatus 12, a display unit 14, and a controller 16.

The entertainment apparatus 12 related to this embodiment is a computer such as a game console, a DVD (Digital Versatile Disk) player, or a Blu-ray (registered trademark) player. The entertainment apparatus 12 generates images and sounds by executing or reproducing game programs and content that are stored internally or recorded on optical disks, for example. The entertainment apparatus 12 then outputs to the display unit 14 a video signal indicative of generated images and an audio signal representative of generated sounds.

The entertainment apparatus 12 related to this embodiment includes a processor 20, a storage section 22, a communication section 24, an input/output section 26, and a display controller 28 as depicted in FIG. 3, for example.

The processor 20 is a program-controlled device such as a CPU (Central Processing Unit) operating according to programs to be installed into the entertainment apparatus 12. The processor 20 related to this embodiment includes a GPU (Graphics Processing Unit) that renders images in a frame buffer on the basis of graphics commands and data supplied from the CPU.

The storage section 22 is a storage element such as a ROM (Read Only Memory) or a RAM (Random Access Memory), or a hard disk drive, for example. The storage section 22 stores the programs to be executed by the processor 20, for example. Also, the storage section 22 related to this embodiment has the region of a frame buffer allocated therein in which images are rendered by the GPU.

The communication section 24 is a communication interface such as a wireless LAN (Local Area Network) module.

The input/output section 26 is an input/output port such as an HDMI (registered trademark) (High-Definition Multimedia Interface) or a USB (Universal Serial Bus) port.

The display controller 28 is a hardware device that performs image scaling, image quality adjustment such as image color conversion, and image composition, among others.

The display unit 14 related to this embodiment is a display section such as a liquid crystal display that displays images represented by the video signal output from the entertainment apparatus 12, for example.

The entertainment apparatus 12 and the display unit 14 are connected with each other via an HDMI cable, for example.

The controller 16 related to this embodiment is an operation input apparatus for performing input operations on the entertainment apparatus 12. A user may carry out diverse input operations using the controller 16 of which the arrow keys and buttons may be pressed or the operating sticks may be tilted. In this embodiment, the controller 16 outputs the input data associated with input operations to the entertainment apparatus 12. The controller 16 related to this embodiment further includes a USB port. When connected by a USB cable with the entertainment apparatus 12, the controller 16 can output input data to the entertainment apparatus 12 in wired fashion. The controller 16 also has a wireless communication module that allows the input data to be output wirelessly to the entertainment apparatus 12.

The terminal 11 related to this embodiment is a computer system such as a personal computer, a smartphone, or a tablet terminal. Note that it does not matter whether the terminal 11 is a system similar to the entertainment system 10.

In this embodiment, for example, the entertainment apparatus 12 included in the entertainment system 10 executes an application program to generate images that reflect the execution state of the application program. For example, a game program executed by the entertainment apparatus 12 permits generation of images representative of game play status.

Figure 4:
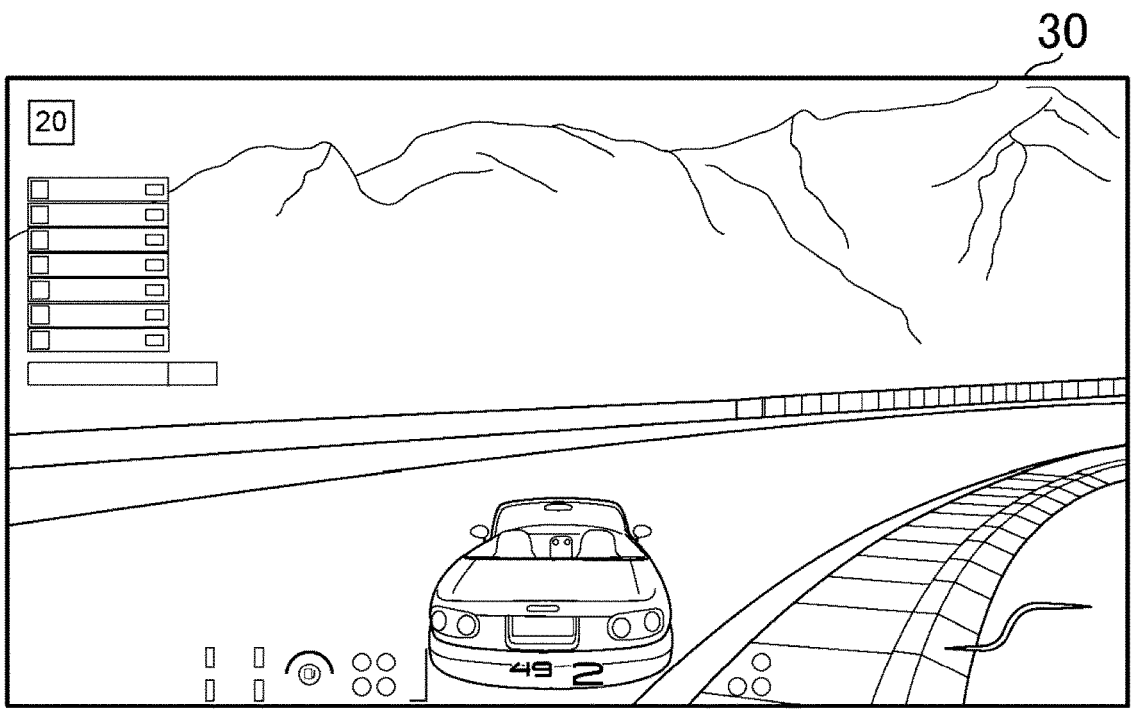
FIG. 4 is a diagram depicting an example of a rendered image.

FIG. 4 is a diagram depicting an example of a rendered image 30 corresponding to a frame image included in the images representing the game play status. In this embodiment, for example, the processor 20 executes an application program such as a game program to generate the rendered image 30. Then, the rendered image 30 is drawn in the frame buffer region allocated in the storage section 22.

Figure 5:
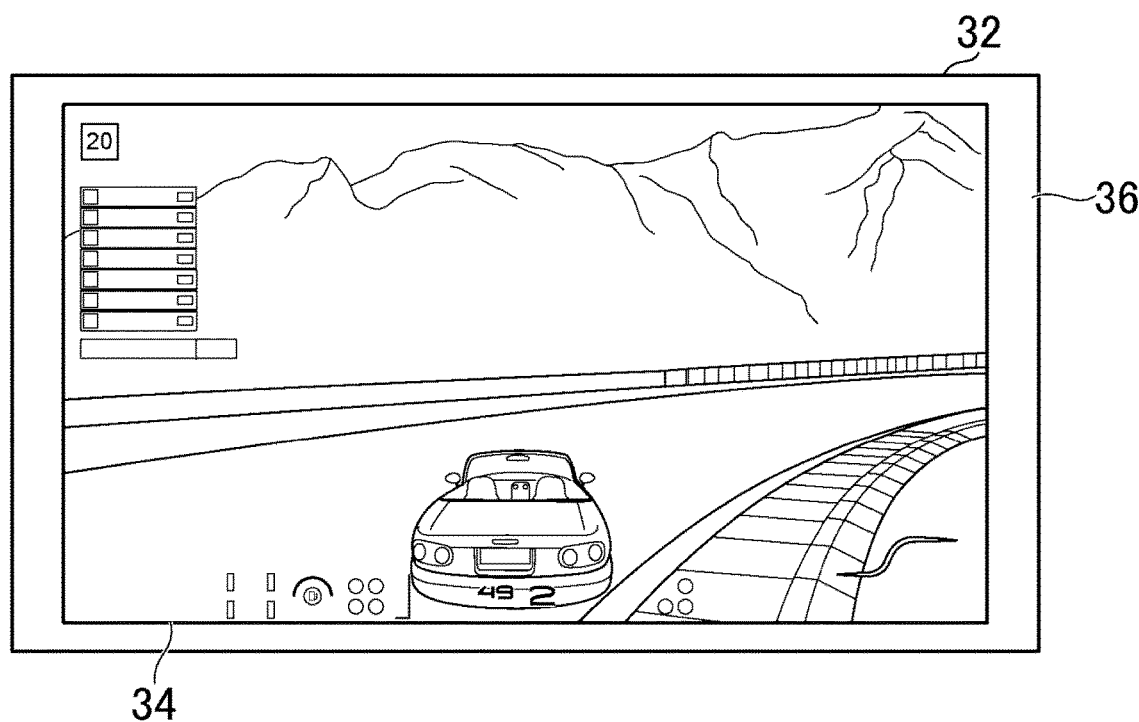
FIG. 5 is a diagram depicting an example of a display target image.

In this embodiment, the display controller 28 reads from the frame buffer the rendered image 30 drawn therein so as to generate a display target image 32 depicted in FIG. 5 on the basis of the rendered image 30.

The display target image 32 in FIG. 5 portrays a display region 34 corresponding to a safe area set by the display unit 14. In this embodiment, for example, the display controller 28 generates the display target image 32 by resizing the rendered image 30 to fit it into the display region 34 and by arranging pixels of a predetermined color such as black in a display non-target region 36 that frames the display region 34. Alternatively, the rendered image 30 may be arranged in the display region 34 without being resized.

The display controller 28 then outputs the display target image 32 to the display unit 14 via the input/output section 26.

For example, when the rendered image 30 depicted in FIG. 4 is caused to appear on the display unit 14, edges of the rendered image 30 might be cut off and not displayed depending on the size of the safe area of the display unit 14. In practice, only an actual display image making up a portion of the rendered image 30 may be displayed on the display unit 14, for example.

In this embodiment, as described above, the display target image 32 generated on the basis of the rendered image 30 is displayed on the display unit 14. Thus, even if overscan causes only the actual display image to appear in the display region 34 as a portion of the display target image 32, the whole content of the rendered image 30 is displayed on the display unit 14. In the description that follows, the process of generating the display target image 32 such as one in FIG. 5 will be referred to as the auto scaling process.

Also in this embodiment, for example, images representing the game play status during a live game broadcast or a multiplayer game are distributed from the entertainment apparatus 12 to the terminals 11. Here, when the display section of the terminal 11 has the entire display target image 32 displayed in a browser, for example, the display screen of the terminal 11 displays an image different from the actual display image displayed on the display unit 14.

Figure 6:
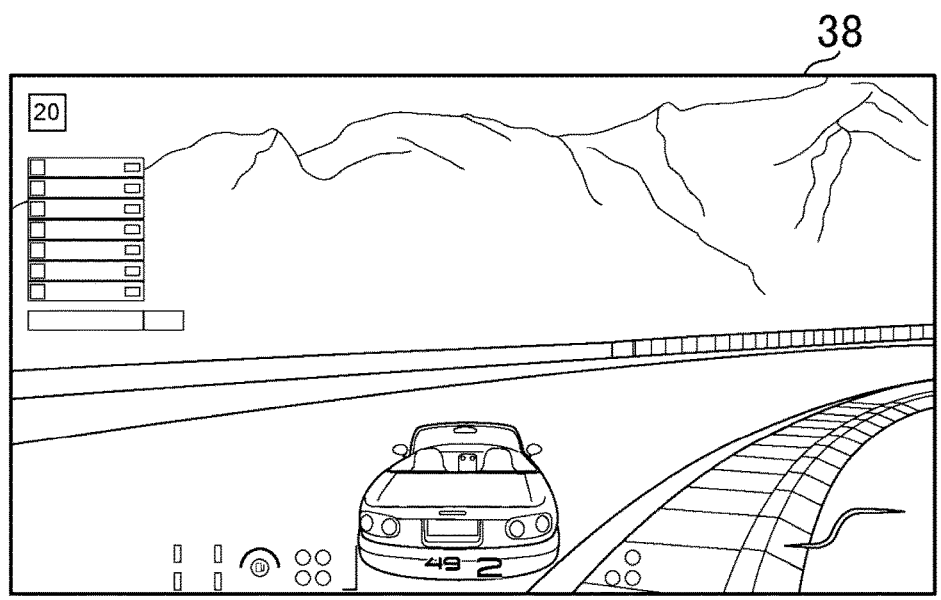
FIG. 6 is a diagram depicting an example of a transmission image.

In this embodiment, the entertainment apparatus 12 generates a transmission image 38 depicted in FIG. 6. The entertainment apparatus 12 then transmits the transmission image 38 to the terminal 11. Thus, even if the transmission image 38 as a whole is displayed on the screen of the display section of the terminal 11, at least a portion of the display non-target region 36 is not displayed on the display section of the terminal 11. In this manner, the embodiment enables the terminal 11 to display an image similar to the one displayed on the entertainment system 10.

Described below are the functions of the entertainment apparatus 12 related to this embodiment and the processes performed thereby, the description focusing on the process of transmitting the transmission image 38.

Figure 7:
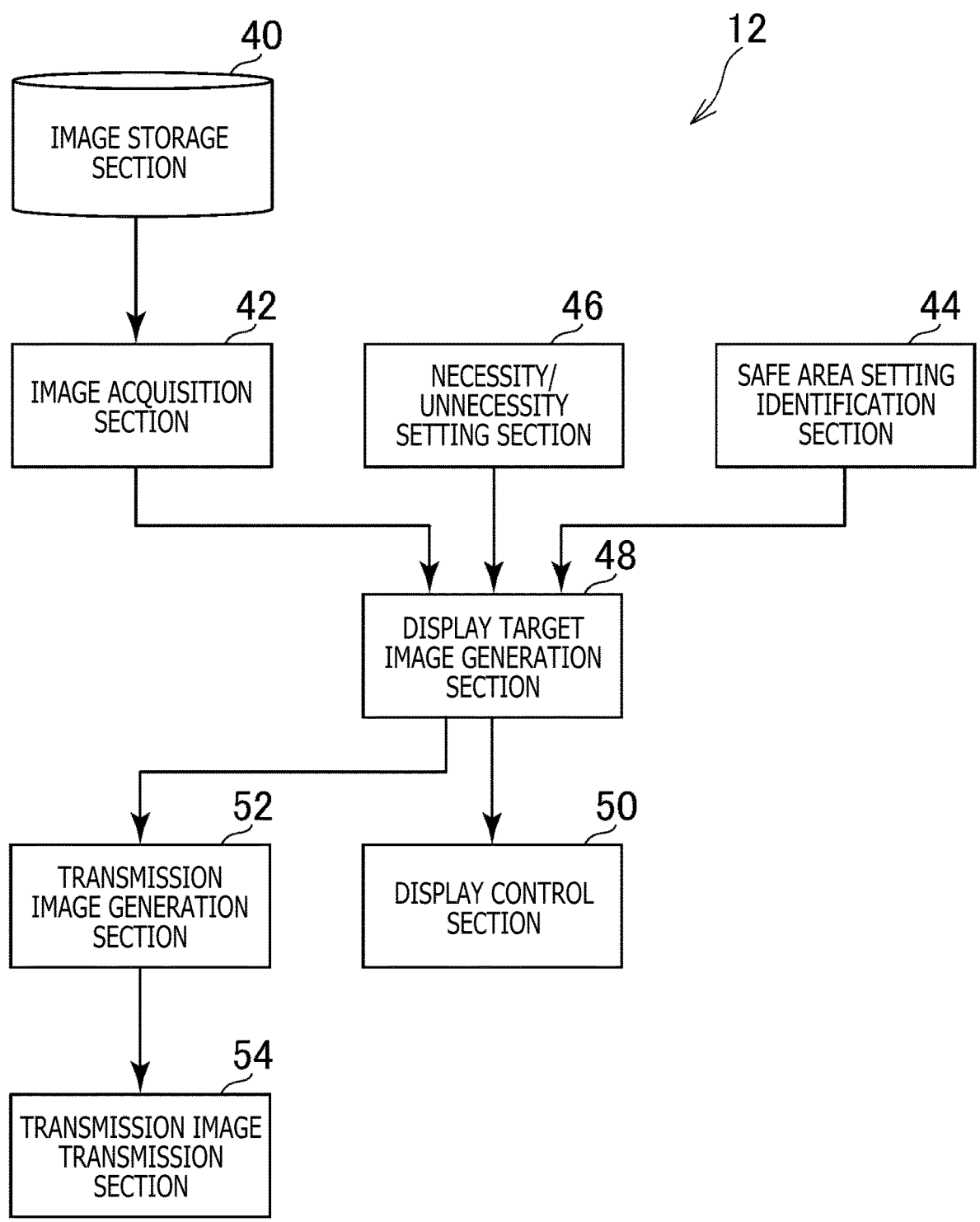
FIG. 7 is a functional block diagram indicative of typical functions of the entertainment apparatus related to one embodiment of the present invention.

FIG. 7 is a functional block diagram indicative of typical functions implemented by the entertainment apparatus 12 related to this embodiment. It is to be noted that not all functions indicated in FIG. 7 need to be implemented by the entertainment apparatus 12 and that functions other than those in FIG. 7 may be implemented as well.

As depicted in FIG. 7, the entertainment apparatus 12 functionally includes, for example, an image storage section 40, an image acquisition section 42, a safe area setting identification section 44, a necessity/unnecessity setting section 46, a display target image generation section 48, a display control section 50, a transmission image generation section 52, and a transmission image transmission section 54. The image storage section 40 is implemented using mainly the storage section 22. The image acquisition section 42, the safe area setting identification section 44, the display target image generation section 48, and the transmission image generation section 52 are implemented using mainly the display controller 28. The necessity/unnecessity setting section 46 is implemented using mainly the processor 20 and storage section 22. The display control section 50 is implemented using mainly the storage section 22, input/output section 26, and display controller 28. The transmission image transmission section 54 is implemented using mainly the communication section 24.

The above functions may preferably be implemented by the processor 20 or the display controller 28 executing a program including commands representing the functions. The program may be supplied to the entertainment apparatus 12 by means of computer-readable information storage media such as an optical disk, a magnetic disk, a magnetic tape, a magneto-optical disk, or a flash memory. The program may alternatively be supplied to the entertainment apparatus 12 via the Internet, for example.

The image storage section 40 stores, in this embodiment, for example, the rendered image 30. The image stored in the region of the frame buffer allocated in the storage section 22 corresponds to the rendered image 30 stored in the image storage section 40. Here, for example, the processor 20 executes an application program causing a newly rendered image 30 to be stored at a predetermined frame rate into the frame buffer included in the image storage section 40.

The image acquisition section 42 acquires, in this embodiment, for example, the rendered image 30 stored in the image storage section 40. Here, for example, the image acquisition section 42 acquires the rendered image 30 stored in the frame buffer.

The safe area setting identification section 44 identifies, in this embodiment, for example, the settings of the safe area of the display unit 14. The safe area setting identification section 44 may identify the size settings of the safe area established in response to the user's operations, for example. Alternatively, the safe area setting identification section 44 may identify the size settings of the safe area based on information such as display specs (e.g., EDID (Extended Display Identification Data)) that can be acquired from the display unit 14.

For example, of the image generated by the display target image generation section 48 to be discussed later, the percentage of the portion to be actually displayed on the display unit 14 may be represented by the safe area settings identified by the safe area setting identification section 44.

Here, for example, in a case where there is no overscan and where the image generated by the display target image generation section 48 is displayed in its entirety on the display unit 14, the percentage represented by the safe area settings is 100%. Further, in a case where the image displayed on the display unit 14 occupies 90% of the horizontal and vertical sizes of the image generated by the display target image generation section 48, the sizes being relative to the image center, the percentage represented by the safe area settings is 90%.

The necessity/unnecessity setting section 46 stores, in this embodiment, for example, necessity/unnecessity data indicative of whether the auto scaling process is necessary. Here, in a case where the value of the necessity/unnecessity data is 1, for example, the auto scaling process is carried out. In a case where the value of the necessity/unnecessity data is 0, the auto scaling process is not performed.

Further, the necessity/unnecessity setting section 46 sets, in this embodiment, for example, the value of the necessity/unnecessity data stored therein in response to a setting instruction received from an application program and indicative of the necessity or unnecessity of the auto scaling process. For example, in a case where a setting instruction indicating the necessity of auto scaling is received from the application program, the necessity/unnecessity setting section 46 sets the value of the necessity/unnecessity data stored therein to 1.

Further, in a case where a setting instruction indicating the unnecessity of auto scaling is received from the application program, the necessity/unnecessity setting section 46 sets the value of the necessity/unnecessity data held therein to 0.

The display target image generation section 48 generates, in this embodiment, for example, the display target image 32 partially including the rendered image 30 of which the sizes reflect the safe area settings identified by the safe area setting identification section 44.

For example, the display target image generation section 48 identifies the sizes of the display region 34 based on the safe area settings identified by the safe area setting identification section 44. The display target image generation section 48 then generates the display target image 32 by arranging the rendered image 30 acquired by the image acquisition section 42 into the display region 34 of which the center position is the same as that of the display target image 32. Here, for example, the display target image generation section 48 may generate the display target image 32 by resizing the rendered image 30 to fit it into the display region 34 and by arranging pixels of a predetermined color such as black in the display non-target region 36 that frames the display region 34. Preferably, the rendered image 30 may be arranged into the display region 34 without being resized. For example, in a case where the percentage represented by the safe area settings is 90%, the display target image generation section 48 may arrange inside the display region 34 the rendered image 30 acquired by the image acquisition section 42 and resized in such a manner that the horizontal and vertical sizes of the rendered image 30 occupy 90% of those of the display target image 32 respectively.

Also, in response to an instruction received by the necessity/unnecessity setting section 46 from the application program, the display target image generation section 48 controls whether or not to generate the display target image 32 partially including the rendered image 30 of which the sizes reflect the safe area settings. For example, in a case where the value of the necessity/unnecessity data stored in the necessity/unnecessity setting section 46 is 1, the display target image generation section 48 carries out the auto scaling process. In a case where the value of the necessity/unnecessity data held in the necessity/unnecessity setting section 46 is 0, the display target image generation section 48 does not perform the auto scaling process.

In this embodiment, for example, the display control section 50 causes the display unit 14 to display the display target image 32.

In this embodiment, for example, as discussed above, in the case where the value of the necessity/unnecessity data stored in the necessity/unnecessity setting section 46 is 1, the auto scaling process is carried out. Here, if the percentage represented by the safe area settings is 100%, the display unit 14 displays the display target image 32 in its entirety. In a case where the percentage represented by the safe area settings is less than 100%, there is overscan causing the display unit 14 to display the actual display image as a portion of the display target image 32. For example, of the display target image 32 depicted in FIG. 5, only the portion inside the display region 34 is displayed on the display unit 14.

As discussed above, in this embodiment, for example, in the case where the value of the necessity/unnecessity data stored in the necessity/unnecessity setting section 46 is 0, the auto scaling process is not carried out. In this case, the entire rendered image 30 is displayed as the display target image 32 on the display unit 14.

In this embodiment, for example, the transmission image generation section 52 generates the transmission image 38 that excludes at least a portion of the display non-target region 36 and partially represents the display target image 32.

The transmission image generation section 52 generates the transmission image 38 by clipping, from the display target image 32, for example, an image occupied by the display region 34 identified on the basis of the safe area settings.

The transmission image transmission section 54 transmits, in this embodiment, for example, the transmission image 38 generated by the transmission image generation section 52 to the terminal 11.

Figure 8:
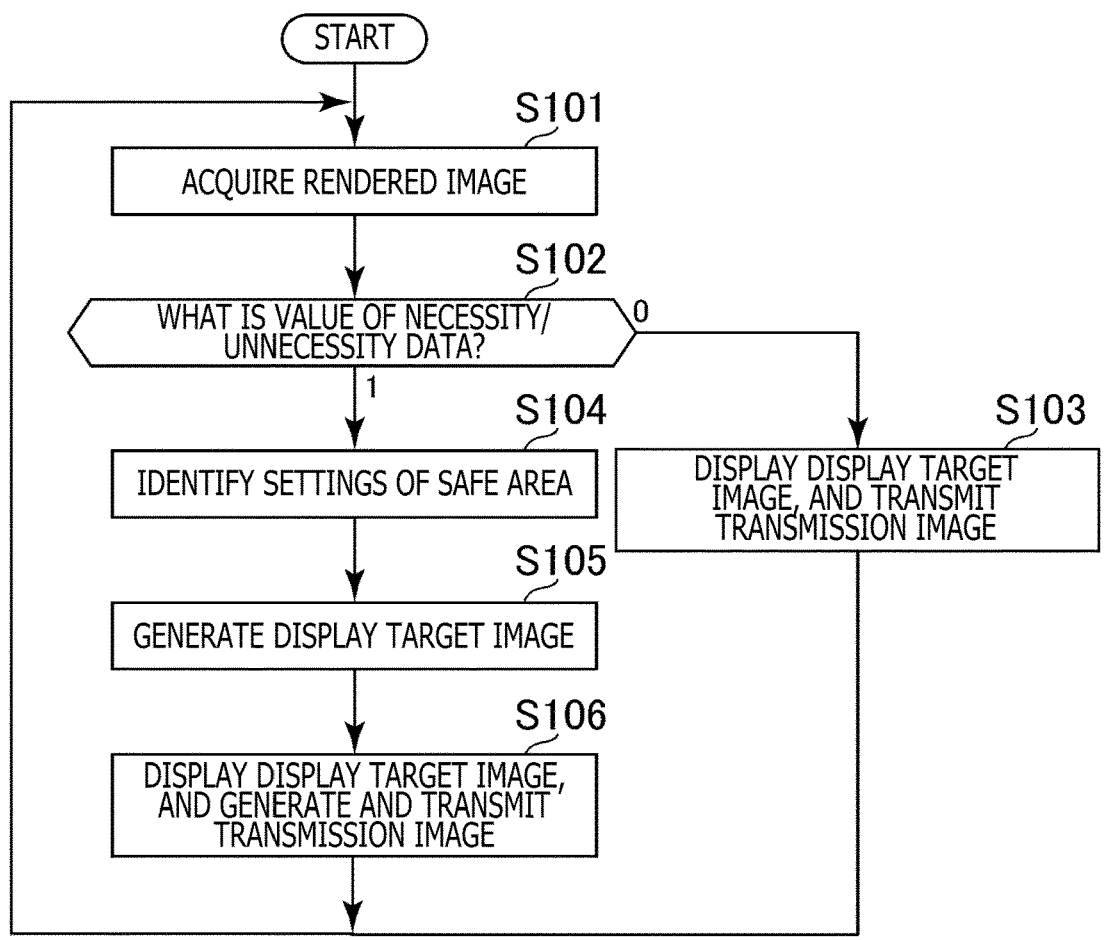
FIG. 8 is a flowchart indicative of a typical flow of processes performed by the entertainment apparatus related to one embodiment of the present invention.

Explained below with reference to the flowchart of FIG. 8 is a typical flow of processes performed repeatedly at a predetermined frame rate by the entertainment apparatus 12 related to this embodiment.

First, the image acquisition section 42 acquires the rendered image 30 of the current frame stored in the image storage section 40 (S101).

The safe area setting identification section 44 then verifies the value of the necessity/unnecessity data stored in the necessity/unnecessity setting section 46 (S102).

In a case where the value of the necessity/unnecessity data is 0, the display target image generation section 48 causes the display unit 14 to display as the display target image 32 the rendered image 30 acquired by the display target image generation section 48 in the process of S101. At the same time, the display target image generation section 48 transmits the rendered image 30 to the terminal 11 as the transmission image 38 (S103), before returning to the process of S101. In this case, the display target image 32 and the transmission image 38 are each identical to the rendered image 30.

In a case where the value of the necessity/unnecessity data is 1, the safe area setting identification section 44 identifies the settings of the safe area (S104).

The display target image generation section 48 then generates the display target image 32 partially including the rendered image 30 resized to reflect the safe area settings identified in the process of S104 (S105).

The display control section 50 then causes the display unit 14 to display the display target image 32 generated in the process of S105. At the same time, the transmission image generation section 52 generates the transmission image 38. The transmission image transmission section 54 transmits the transmission image 38 thus generated to the terminal 11 (S106), before returning to the process of S101. If overscan occurs in the process of S106, only a portion of the display target image 32 generated in the process of S105 is displayed on the display unit 14.

Here, for example, the transmission image 38 may be generated by clipping from the display target image 32 an image sized to reflect the safe area settings. For example, in a case where the percentage represented by the safe area settings is 90%, the transmission image generation section 52 may generate the transmission image 38 by clipping an image of which the horizontal and vertical sizes respectively occupy 90% of those of the display target image 32, the clipped image centering on the center of the display target image 32. Further, in a case where the auto scaling process is not performed, the transmission image generation section 52 may generate the transmission image 38 identical to the display target image 32.

The transmission image 38 transmitted in this manner to the terminal 11 is displayed on the screen of the display section thereof.

In this processing example, the processes of S101 through S106 are carried out repeatedly at a predetermined frame rate.

This embodiment enables developers of application programs such as game programs to implement the programs without becoming aware of the safe area.

Further, depending on the scene of a game, for example, it may or may not be necessary to execute the auto scaling process thereon. In view of this, the embodiment allows the developers of application programs to control whether or not to execute the auto scaling process depending on the game scene as described above, for example.

Further, this embodiment enables the terminal 11 to display an image similar to the image displayed on the entertainment system 10.

In this embodiment, the image storage section 40 may have multiple regions of frame buffers allocated therein. Each of the frame buffers may be arranged to store an image.

Figure 9:
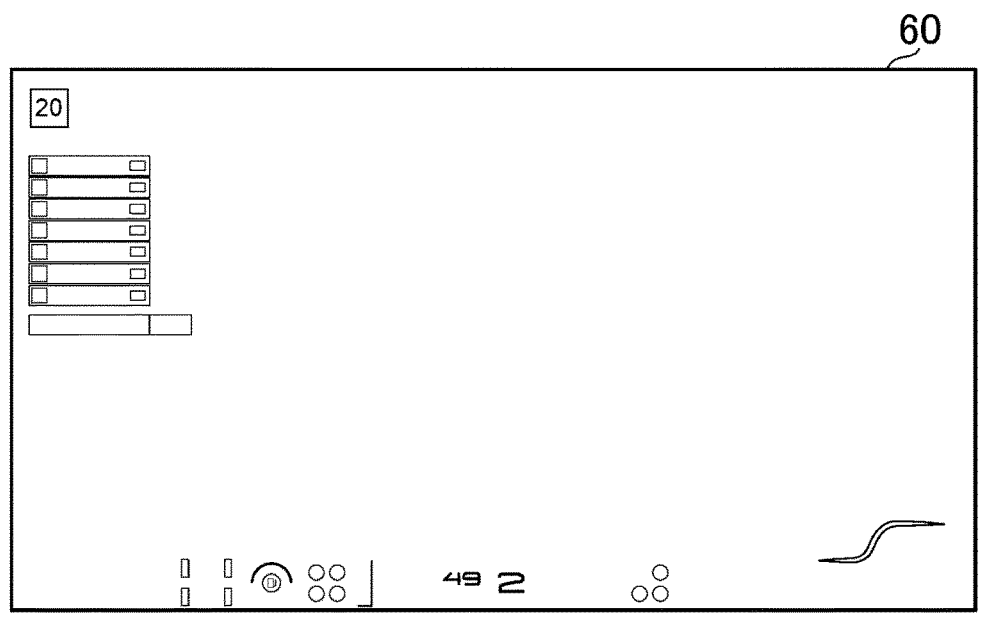
FIG. 9 is a diagram depicting another example of the rendered image.
Figure 10:
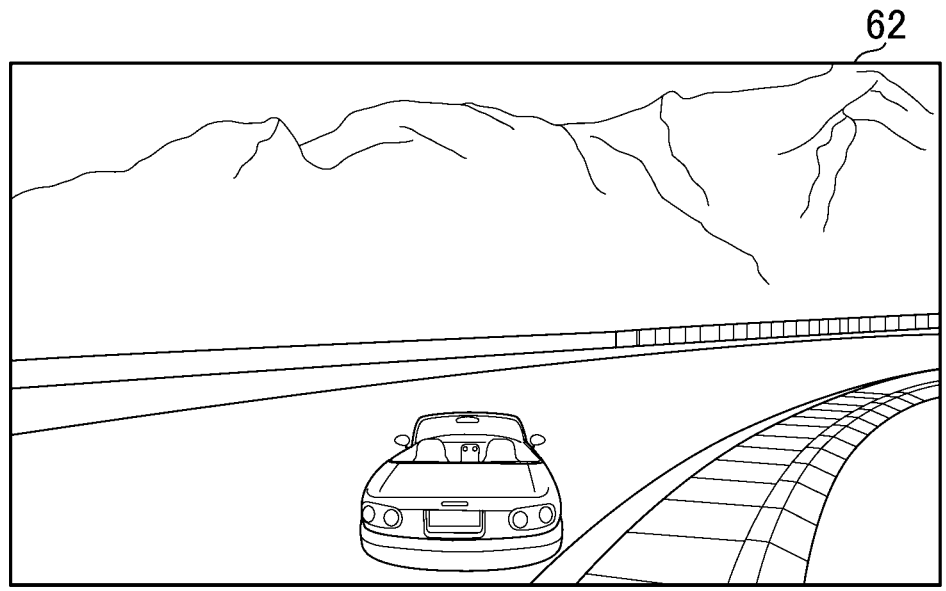
FIG. 10 is a diagram depicting another example of the rendered image.

FIG. 9 is a diagram depicting an example of a rendered image 60 corresponding to the frame image stored in a first frame buffer included in the image storage section 40. FIG. 10 is a diagram depicting an example of a rendered image 62 corresponding to the frame image held in a second frame buffer in the image storage section 40.

The rendered image 60 in FIG. 9 is a frame image indicative of information regarding the user interface of games, such as explanations of input operations in a game and information regarding the status of characters therein. As depicted in FIG. 9, the rendered image 60 may represent texts, pictorial figures, or two-dimensional objects indicative of symbols, for example. Here, each of the pixels included in the rendered image 60 may be set with an alpha value.

The rendered image 62 in FIG. 10 is a frame image in 3D graphics indicative of the play status of a game having virtual three-dimensional objects such as game objects in a virtual three-dimensional space as viewed from a viewpoint in that virtual three-dimensional space.

For example, the processor 20 may execute an application program causing the new rendered images 60 and 62 to be stored into the first and the second frame buffers respectively at a predetermined frame rate.

Then, in the process of S101, the image acquisition section 42 may acquire the rendered image 60 stored in the first frame buffer and the rendered image 62 held in the second frame buffer.

In this case, the necessity/unnecessity setting section 46 may store necessity/unnecessity data indicative of the necessity or unnecessity of the auto scaling process on each of the frame buffers. For example, the necessity/unnecessity setting section 46 may store the necessity/unnecessity data corresponding to the first frame buffer as well as the necessity/unnecessity data corresponding to the second frame buffer.

Further, as discussed above, the necessity/unnecessity setting section 46 may set the value of the necessity/unnecessity data stored therein in response to a setting instruction indicating the necessity or unnecessity of the auto scaling process received from the application program.

For example, in a case of receiving from the application program a setting instruction indicating the necessity of auto scaling on the first frame buffer, the necessity/unnecessity setting section 46 may set to 1 the value of the necessity/unnecessity data stored therein corresponding to the first frame buffer. Further, in a case of receiving from the application program a setting instruction indicating the necessity of auto scaling on the second frame buffer, for example, the necessity/unnecessity setting section 46 may set to 1 the value of the necessity/unnecessity data stored therein corresponding to the second frame buffer.

Further, for example, in a case of receiving from the application program a setting instruction indicating the unnecessity of auto scaling on the first frame buffer, the necessity/unnecessity setting section 46 may set to 0 the value of the necessity/unnecessity data stored therein corresponding to the first frame buffer. Further, in a case of receiving from the application program a setting instruction indicating the unnecessity of auto scaling on the second frame buffer, for example, the necessity/unnecessity setting section 46 may set to 0 the value of the necessity/unnecessity data stored therein corresponding to the second frame buffer.

In response to the instruction received by the necessity/unnecessity setting section 46 from the application program, the display target image generation section 48 may control whether or not to execute the auto scaling process on each of the frame buffers.

Figure 11:
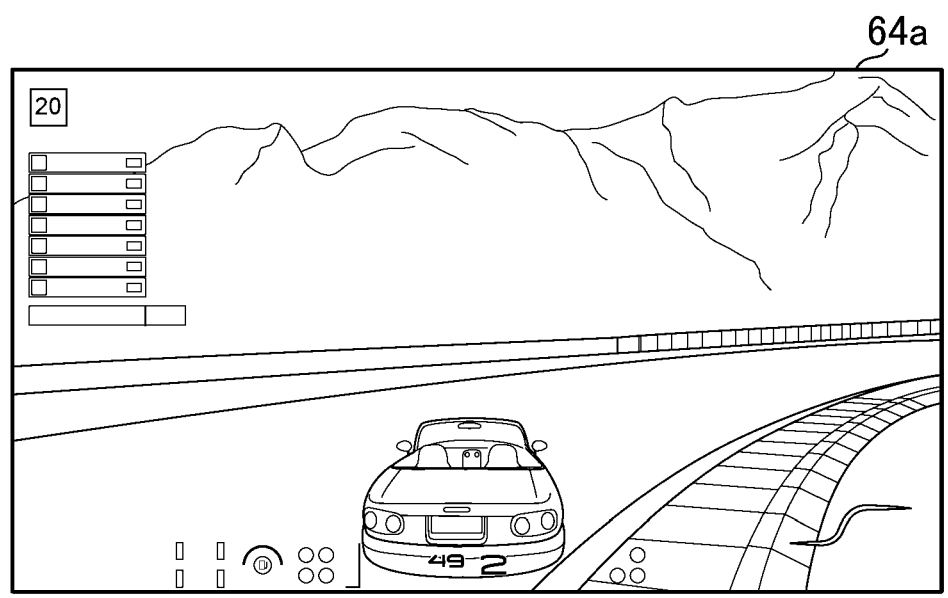
FIG. 11 is a diagram depicting another example of the display target image.

It is assumed here, for example, that the value of the necessity/unnecessity data is 0 corresponding to the first frame buffer and that the value of the necessity/unnecessity data is also 0 corresponding to the second frame buffer. In this case, the display target image generation section 48 may generate a display target image 64a depicted in FIG. 11, the display target image 64a being formed of the rendered images 60 and 62 overlaid on each other, the rendered images 60 and 62 having been acquired from the first and the second frame buffers respectively. For example, the display target image 64a may be generated by executing an alpha blending process based on the rendered image 60, on the alpha values set to the pixels included therein, and on the rendered image 62. Then, the display control section 50 may cause the display unit 14 to display the display target image 64a thus generated.

In this case, the transmission image generation section 52 may generate a transmission image identical to the display target image 64a.

For example, it is further assumed that the value of the necessity/unnecessity data is 1 corresponding to the first frame buffer and that the value of the necessity/unnecessity data is 0 corresponding to the second frame buffer. In this case, the display target image generation section 48 may generate a display target image 64b depicted in FIG. 12, the display target image 64b being formed of the rendered images 60 and 62 overlaid with each other, the rendered image 60 having been sized to reflect the safe area settings. For example, the display target image 64b may be generated by executing the alpha blending process based on the rendered image 60, on the alpha values set to the pixels included therein, and on the rendered image 62.

Figure 12:
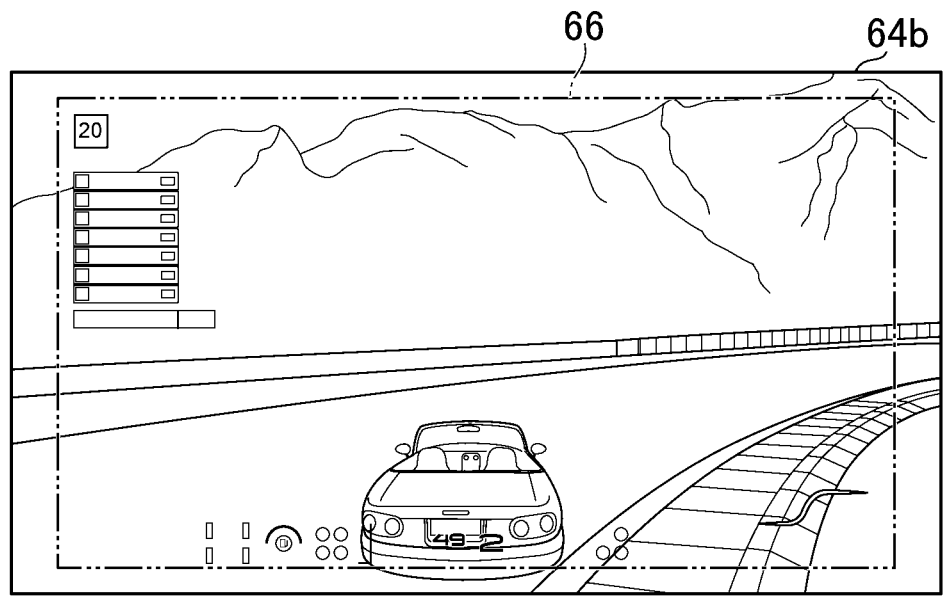
FIG. 12 is a diagram depicting another example of the display target image.

Here, for example, the display target image generation section 48 may resize the rendered image 60 acquired from the first frame buffer to fit it into a display region 66. Then, the display target image 64b with the resized rendered image 60 arranged at its center may be generated. In the display target image 64b, as depicted in FIG. 12, the resized rendered image 60 may be arranged in such a manner as to be fit into the display region 66 identified on the basis of the safe area settings.

Thereafter, the display control section 50 may cause the display unit 14 to display the display target image 64b generated in this manner. Here, in a case where there occurs overscan, only a portion of the display target image 64b thus generated is displayed on the display unit 14.

As described above, even if overscan occurs, the information that concerns the user interface of games and represents texts, pictural figures, or two-dimensional objects as symbols is unfailingly displayed. Meanwhile, in 3D graphics, the degradation of image quality is prevented because the scaling process is not carried out.

Figure 13:
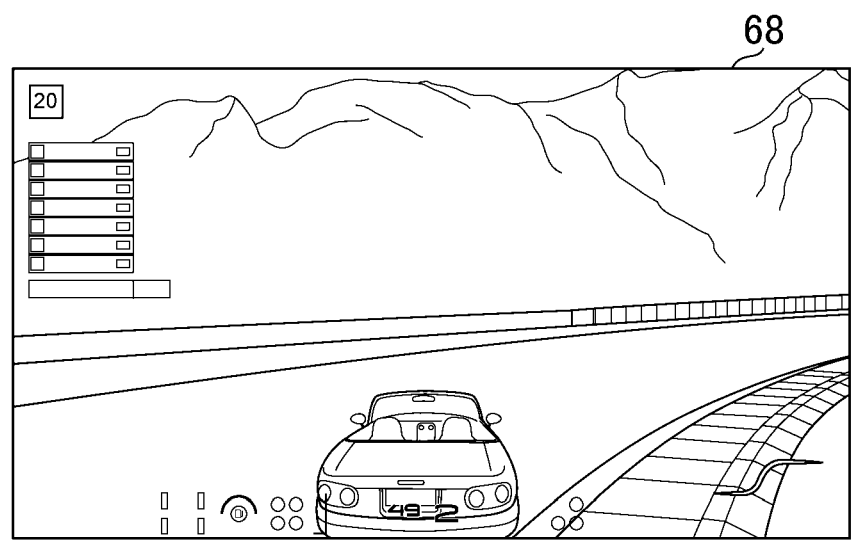
FIG. 13 is a diagram depicting another example of the transmission image.

In this case, the transmission image generation section 52 may generate a transmission image 68 in FIG. 13 by clipping from the display target image 64b an image occupied by the display region 66 identified on the basis of the safe area settings. Note that it is also possible to generate the transmission image 68 by clipping from the display target image 64b an image portion occupied by the display region 66 and by resizing the clipped image. According to this embodiment, even if the auto scaling process is performed on each frame buffer, the transmission image 68 is clipped from the most recently displayed image.

Preferably, this embodiment may be used for picture-in-picture (PinP) display on the display unit 14.

Figure 14:
FIG. 14 is a diagram depicting an example of an above image.

FIG. 14 is a diagram depicting an example of an above image 70. The above image 70 in FIG. 14 may represent the background in PinP display, for example.

Figure 15:
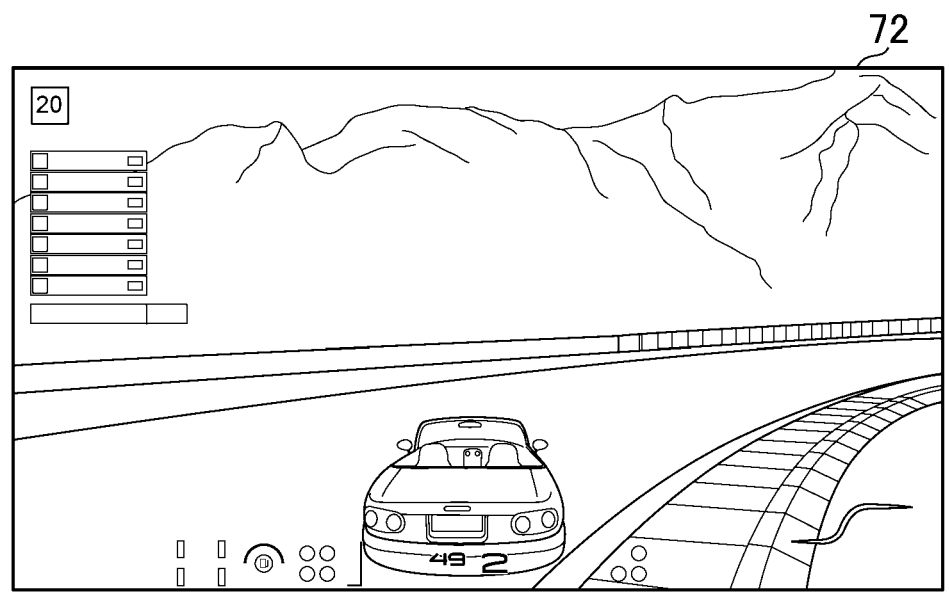
FIG. 15 is a diagram depicting an example of a below image.

FIG. 15 is a diagram depicting an example of a below image 72. The below image 72 in FIG. 15 may be an image indicative of the content to be embedded in the background in PinP display, for example. It is assumed here that the below image 72 in FIG. 15 is similar to the rendered image 30 depicted in FIG. 4.

For example, the processor 20 executes a first application program causing the below image 72 to be rendered as a new frame image in the first frame buffer at a predetermined frame rate. As another example, the processor 20 executes a second application program causing the above image 70 to be rendered as a new frame image in the second frame buffer at a predetermined frame rate.

Figure 16:
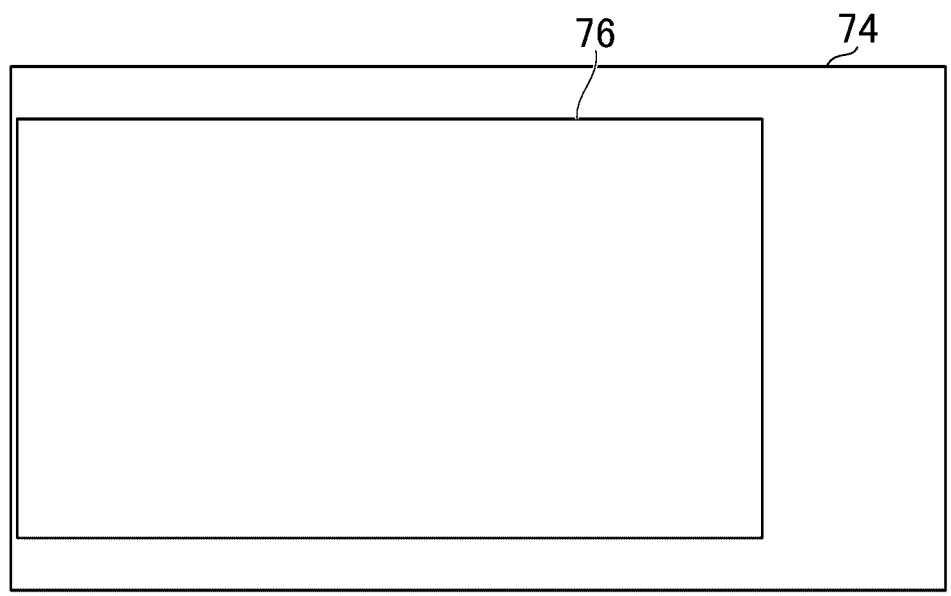
FIG. 16 is a diagram schematically depicting an example of an arrangement region.

Further, in the image storage section 40, layout data is stored to indicate the position and sizes of the below image 72 arranged inside a display target image 74. FIG. 16 schematically depicts an example of an arrangement region 76 identified on the basis of the layout data, the arrangement region 76 being a region in which the below image 72 is arranged. In the example in FIG. 16, the horizontal and vertical sizes of the arrangement region 76 are 80% of those of the display target image 74 respectively.

In this case, the image acquisition section 42 may acquire the above image 70 stored in the second frame buffer and the below image 72 held in the first frame buffer. For example, it is assumed here that the above image 70 in FIG. 14 is acquired from the second frame buffer and that the below image 72 in FIG. 15 is obtained from the first frame buffer.

Figure 17:
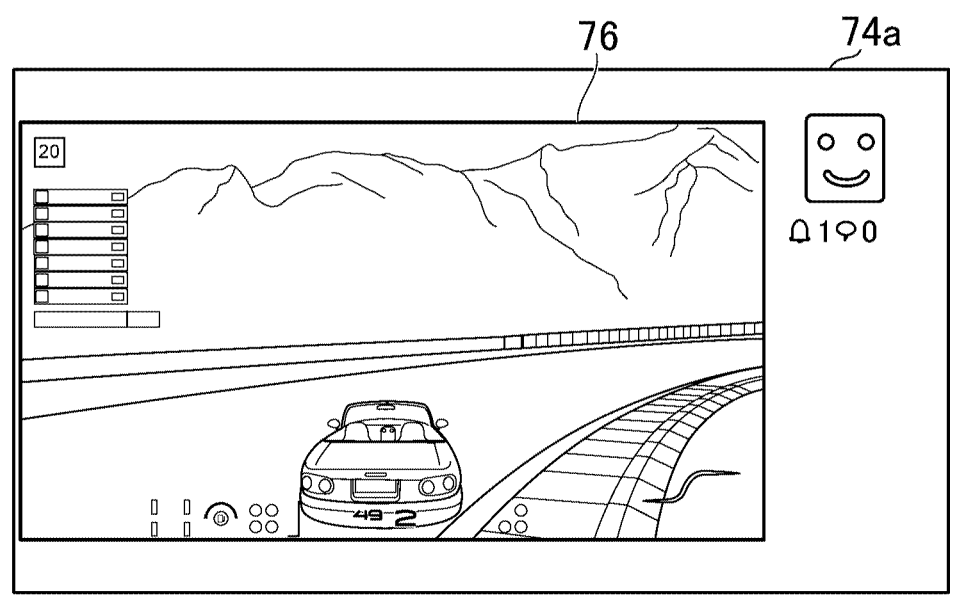
FIG. 17 is a diagram depicting another example of the display target image.

Here, in a case where the auto scaling process is not performed, a display target image 74a depicted in FIG. 17 may be generated. The display target image 74a generated in this manner may then be displayed on the display unit 14.

Here, for example, the display target image 74a may be generated by executing the alpha blending process based on the above image 70, on the alpha values determined on the basis of the layout data, and on the below image 72.

Figure 18:
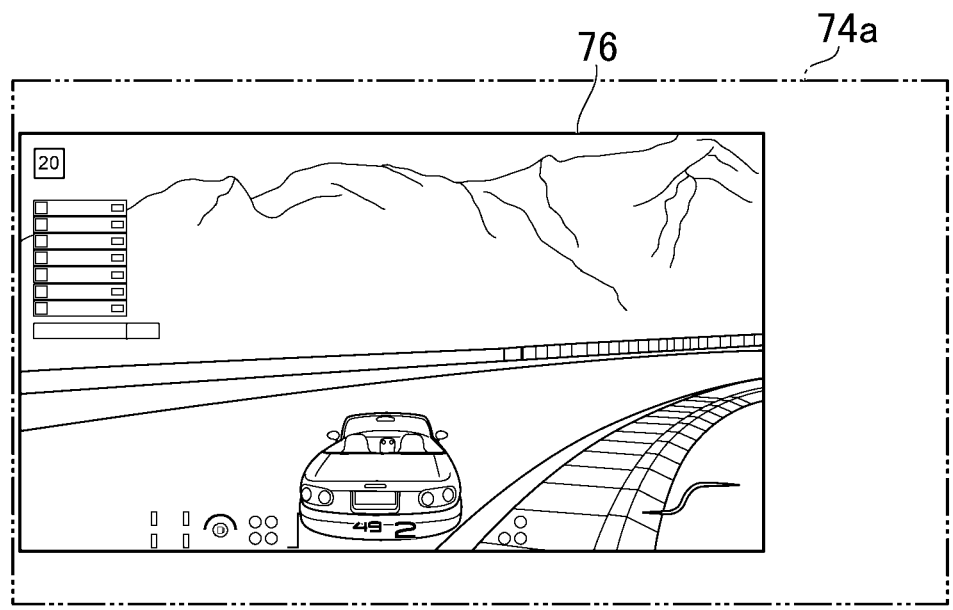
FIG. 18 is a diagram schematically depicting an example of the arrangement of the below image inside the display target image.

FIG. 18 is a diagram schematically depicting a typical arrangement of the below image 72 inside the display target image 74a. As depicted in FIG. 18, in a case where the auto scaling process is not carried out, the below image 72 may be arranged inside the arrangement region 76. The display target image 74a may then be generated by setting to 0 the alpha values of the above image 70 inside the arrangement region 76 and by setting to 1 the alpha values of the above image 70 outside the arrangement region 76. It is assumed here that the alpha value of 0 indicates that the above image 70 is transparent and that the alpha value of 1 indicates that the above image 70 is opaque.

Figure 19:
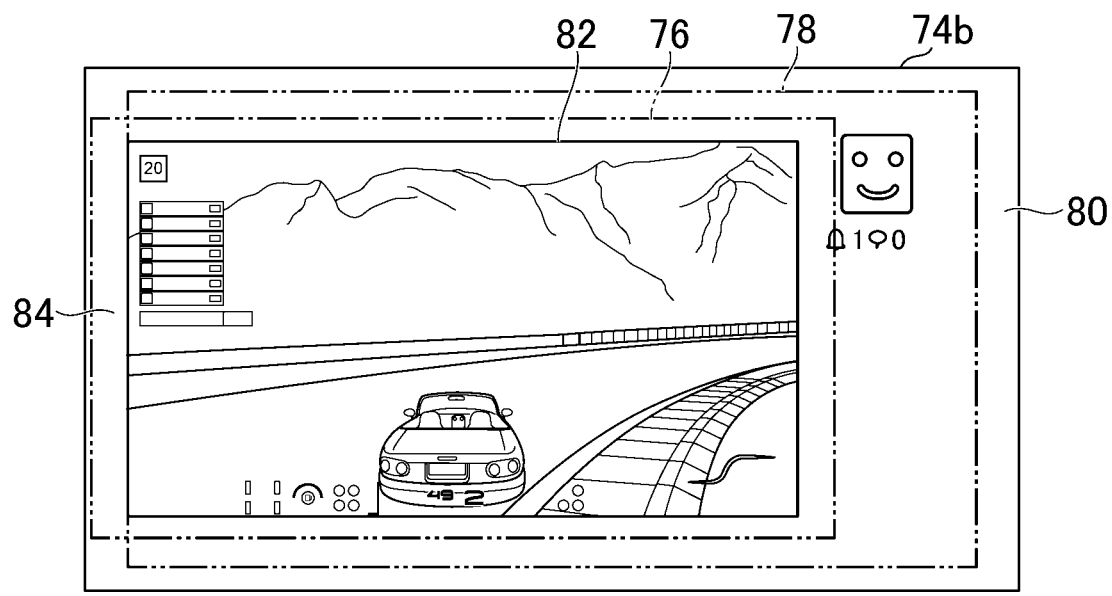
FIG. 19 is a diagram depicting another example of the display target image.

On the other hand, in a case where the auto scaling process is carried out, a display target image 74b depicted in FIG. 19 may be generated. The display target image 74b generated in this manner may then be displayed on the display unit 14. In a case where overscan occurs here, only a portion of the display target image 74b is displayed on the display unit 14.

Here, for example, the display target image 74b may be generated by arranging the above image 70 inside a display region 78 and by arranging pixels of a predetermined color such as black in a display non-target region 80 that frames the display region 78. In a case where the percentage represented by the safe area settings is 90%, what is established here in the display region 78 is the region of which the center position is the same as that of the display target image 74b and of which the horizontal and vertical sizes are 90% of those of the display target image 74b respectively.

As another example, inside the display region 78, the display target image 74b may be generated by executing the alpha blending process based on the above image 70, on the alpha values determined on the basis of the layout data, and on the below image 72.

Figure 20:
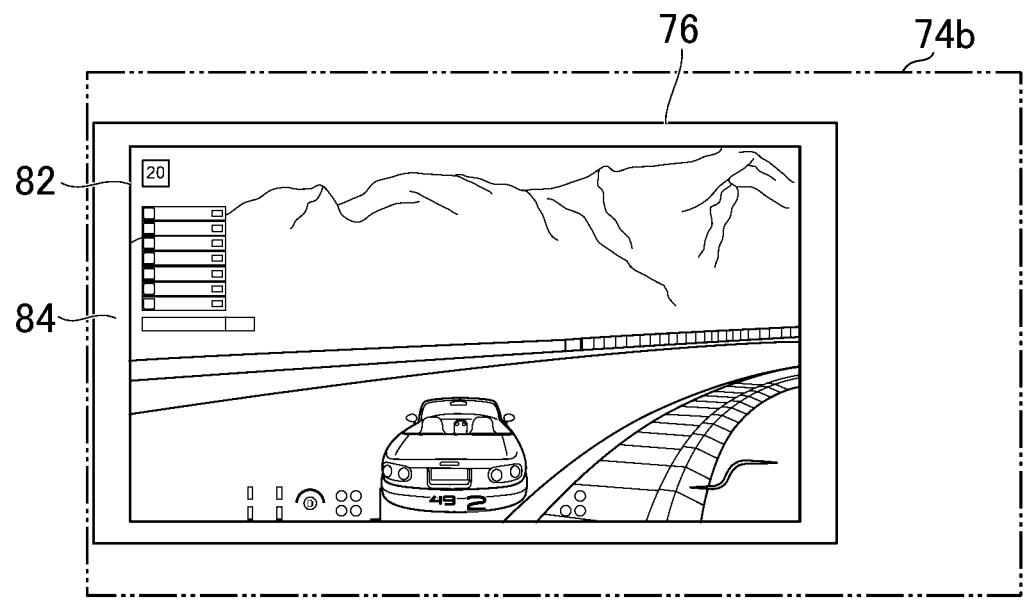
FIG. 20 is a diagram schematically depicting another example of the arrangement of the below image inside the display target image.

FIG. 20 is a diagram schematically depicting a typical arrangement of the below image 72 inside the display target image 74b. As depicted in FIG. 20, in a case where the auto scaling process is performed, the below image 72 may be arranged in a content region 82 inside the arrangement region 76, and pixels of a predetermined color such as black may be arranged in a frame-shaped region 84 outside the content region 82 but inside the arrangement region 76. For example, in a case where the percentage represented by the safe area settings is 90%, what is established here in the content region 82 is the region of which the center position is the same as that of the arrangement region 76 and of which the horizontal and vertical sizes are 90% of those of the arrangement region 76 respectively.

The display target image 74b may also be generated by executing the alpha blending process in which the alpha value is set to 0 for the above image 70 inside the content region 82 and in which the alpha value is set to 1 for the above image 70 outside the content region 82. As discussed above, the alpha value of 0 here indicates that the above image 70 is transparent, and the alpha value of 1 indicates that the above image 70 is opaque.

According to this embodiment, as described above, the display target image generation section 48 arranges the below image 72 of predetermined sizes in a predetermined position inside the display target image 74 regardless of whether or not the auto scaling process is carried out. For example, in a case where the auto scaling process is not performed, the below image 72 is arranged in the arrangement region 76. In a case where the auto scaling process is carried out, an image partially including the below image 72 is arranged in the arrangement region 76.

Depending on whether or not the auto scaling process is carried out, the display target image generation section 48 changes the region that reflects the pixels of the below image 72 in the display target image 74. For example, in a case where the auto scaling process is not performed, the pixels of the below image 72 are reflected inside the arrangement region 76. On the other hand, in a case where the auto scaling process is carried out, the pixels of the below image 72 are reflected inside the content region 82 that is narrower than the arrangement region 76.

In this manner, it is possible to generate the display target image 74 appropriately reflecting the settings of the safe area in PinP display without changing the layout data indicative of the position and the sizes in which to arrange the image corresponding to the below image 72 inside the display target image 74.

Figure 21:
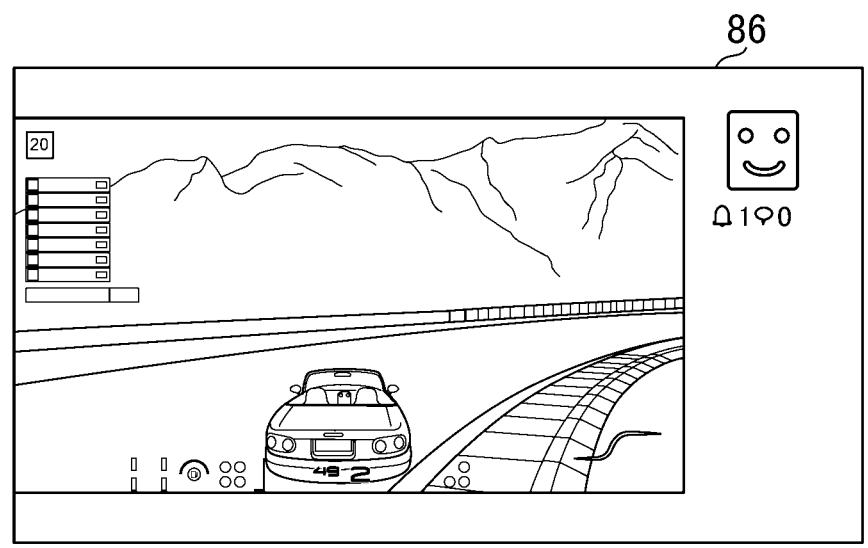
FIG. 21 is a diagram depicting another example of the transmission image.

In this case, the transmission image generation section 52 may generate a transmission image 86 depicted in FIG. 21 by clipping from the display target image 74*b* an image occupied by the display region 78 identified on the basis of the safe area settings. Preferably, the transmission image 86 may be generated by clipping from the display target image 74*b* an image portion occupied by the display region 78 and by resizing the clipped image.

Figure 22:
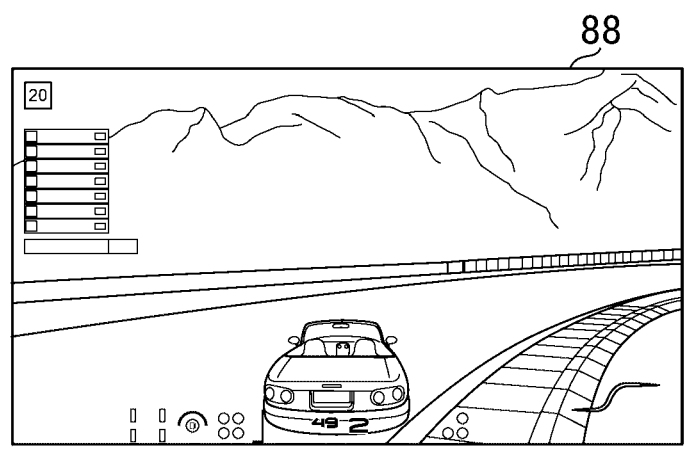
FIG. 22 is a diagram depicting another example of the transmission image.

As another alternative, the transmission image generation section 52 may generate a transmission image 88 depicted in FIG. 22 by clipping from the display target image 74*b* an image occupied by the content region 82 identified on the basis of the safe area settings. In this manner, the transmission image generation section 52 may generate the transmission image 88 representing a portion of the display target image 74*b* in which the rendered image 30 is arranged. As a further alternative, the transmission image 88 may be generated by clipping from the display target image 74*b* an image portion occupied by the content region 82 and by resizing the clipped image.

It is to be noted that the above-described embodiment is not limitative of the present invention.

For example, the transmission image generation section 52 may generate the transmission image by clipping a portion of the rendered image stored in the frame buffer, instead of clipping a portion of the display target image generated by the display target image generation section 48.

Further, even when the above-described auto scaling process is not carried out, the transmission image generation section 52 may generate a transmission image that partially represents the display target image and excludes at least a portion of the target non-target region. For example, the processor 20 may execute an application program to generate a rendered image reflecting the safe area settings and draw the generated image in the frame buffer. A display target image identical to the rendered image in the frame buffer may then be displayed on the display unit 14. Then, the transmission image generation section 52 may proceed to generate the transmission image that partially represents the display target image and excludes at least a portion of the target non-target region.

It is also to be noted that specific character strings and numerical values in the foregoing description as well as in the accompanying drawings are only examples and are not limitative of the present invention.

The invention claimed is:

1. An image transmission apparatus comprising:
circuitry configured to
generate a display target image having a display non-target region reflecting settings of a safe area of a display screen;
cause the display screen to display, on a first terminal, an actual display image constituting a portion of the display target image;
generate a transmission image that represents the portion of the display target image and clips a portion of the display non-target region from the transmission image;
transmit the transmission image for display on a second terminal;
generate the display target image formed of a first image and a second image overlaid with each other, the first image being based on an image rendered in a first frame buffer by a first application program, the second image being based on an image rendered in a second frame buffer by a second application program; and
arrange the first image of a predetermined size in a predetermined position inside the display target image regardless of whether or not the display target image partially including the first image sized to reflect the settings is generated.

2. The image transmission apparatus according to claim 1, wherein the circuitry generates the display target image partially including the first image rendered in the first frame buffer, the rendered image being sized to reflect the settings.

3. The image transmission apparatus according to claim 2, wherein the first and second images being sized to reflect the settings.

4. The image transmission apparatus according to claim 2, wherein, in response to a received instruction, the circuitry controls whether or not to generate the display target image partially including the rendered image sized to reflect the settings.

5. The image transmission apparatus according to claim wherein
depending on whether or not to generate the display target image partially including the first image sized to reflect the settings, the circuitry changes a region in which pixels of the first image are reflected inside the display target image.

6. An image transmission method comprising:
generating a display target image having a display non-target region reflecting settings of a safe area of a display screen;
causing the display screen to display, on a first terminal, an actual display image constituting a portion of the display target image;
generating a transmission image that represents the portion of the display target image and clips a portion of the display non-target region from the transmission image;
transmitting the transmission image for display on a second terminal;
generating the display target image formed of a first image and a second image overlaid with each other, the first image being based on an image rendered in a first frame buffer by a first application program the second image being based on an image rendered in a second frame buffer by a second application program; and
arranging the first image of a predetermined size in a predetermined position inside the display target image regardless of whether or not the display target image partially including the first image sized to reflect the settings is generated.

7. The image transmission method according to claim 6, further comprising
generating the display target image partially including the first image rendered in the first frame buffer, the rendered image being sized to reflect the settings.

8. The image transmission method according to claim 7, wherein the first and second images being sized to reflect the settings.

9. The image transmission method according to claim 7, wherein, in response to a received instruction, controlling whether or not to generate the display target image partially including the rendered image sized to reflect the settings.

10. The image transmission method according to claim 7, wherein
depending on whether or not to generate the display target image partially including the first image sized to reflect the settings, changing a region in which pixels of the first image are reflected inside the display target image.

11. A non-transitory computer readable medium storing executable instructions, which when executed by circuitry, cause the circuitry to perform a method, the method comprising:
   generating a display target image having a display non-target region reflecting settings of a safe area of a display screen;
   causing the display screen to display, on a first terminal, an actual display image constituting a portion of the display target image;
   generating a transmission image that represents the portion of the display target image and clips a portion of the display non-target region from the transmission image;
   transmitting the transmission image for display on a second terminal;
   generating; the display target image formed of a first image and a second image overlaid with each other, the first image being based on an image rendered in a first frame buffer by a first application program, the second image being based on an image rendered in a second frame buffer b a second application program; and
   arranging the first image of a predetermined size in a predetermined position inside the display target image regardless of whether or not the display target image partially including the first image sized to reflect the settings is generated.

12. The non-transitory computer readable medium according to claim 11, further comprising:
   generating the display target image partially including the first image rendered in the first frame buffer, the rendered image being sized to reflect the settings.

13. The non-transitory computer readable medium according to claim 12, wherein the first and second images being sized to reflect the settings.

14. The non-transitory computer readable medium according to claim 12, wherein, in response to a received instruction, controlling whether or not to generate the display target image partially including the rendered image sized to reflect the settings.

15. The non-transitory computer readable medium according to claim 12, wherein
   depending on whether or not to generate the display target image partially including the first image sized to reflect the settings, changing a region in which pixels of the first image are reflected inside the display target image.

* * * * *